United States Patent [19]

Simpson

[11] 3,857,944
[45] Dec. 31, 1974

[54] 1-PIPERAZINOISOQUINOLINES AS INOTROPIC AGENTS
[75] Inventor: William R. Simpson, Mendham, N.J.
[73] Assignee: Sandoz-Wander, Inc., Hanover, N.J.
[22] Filed: Feb. 20, 1973
[21] Appl. No.: 333,490

Related U.S. Application Data
[63] Continuation-in-part of Ser. No. 246,321, April 21, 1972, abandoned.

[52] U.S. Cl. .............................................. 424/250
[51] Int. Cl............................................ A61k 27/00
[58] Field of Search .................................... 424/250

[56] References Cited
UNITED STATES PATENTS
3,594,480   7/1971   Cronin et al...................... 424/250

Primary Examiner—Jerome D. Goldberg
Attorney, Agent, or Firm—Gerald D. Sharkin; Robert S. Honor; Thomas O. McGovern

[57] ABSTRACT

Certain 1-piperazinoisoquinolines, e.g., 1-(4-methylpiperazinyl)-6,7-dimethoxyisoquinoline, are useful as positive inotropic agents.

7 Claims, No Drawings

1-PIPERAZINOISOQUINOLINES AS INOTROPIC AGENTS

This application is a continuation-in-part of copending U.S. Pat. application Ser. No. 246,321, filed Apr. 21, 1972 now abandoned.

This invention relates to the pharmaceutical activity of 1-piperazinoisoquinoline derivatives. More particularly, this invention concerns the use of substituted 1-piperazinoisoquinolines in the treatment of myocardial shock in mammals. The invention also relates to pharmaceutical compositions containing these compounds as an active ingredient thereof.

The active agents with which this invention is concerned may be represented by the following structural formula:

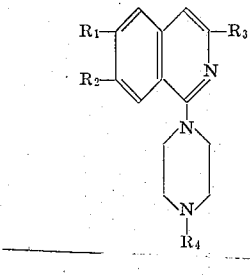

where $R_1$ and $R_2$ each independently represent hydrogen, hydroxy, lower alkyl, i.e., alkyl having 1 to 6 carbon atoms, e.g., methyl, ethyl, isopropyl and the like, or lower alkoxy i.e., alkoxy having 1 to carbon atoms, e.g., methoxy, ethoxy, isopropoxy and the like, or $R_1$ and $R_2$ together represent alkylenedioxy having 1 to 4 carbon atoms, e.g., methylenedioxy, ethylenedioxy, propylenedioxy and the like or together with the carbon atoms to which they are attached they represent a fused benzene ring;

$R_3$ is hydrogen or lower alkyl as defined above, and $R_4$ is hydrogen; lower alkyl as defined above; alkenyl having 3 to 6 carbon atoms, e.g., allyl, 4-hexen-2-yl and the like; unsubstituted aryl having 6 to 10 carbon atoms, e.g., phenyl, tolyl, xylyl, napthyl, and the like or aryl having 6 to 10 carbon atoms mono or di-substituted with alkoxy as defined above, fluorine or chlorine; alkanoyl having 2 to 6 carbon atoms, e.g., acetyl, propionyl, isobutyryl, and the like; aroyl having 7 to 11 carbon atoms, e.g., benzoyl, toloyl, naphthoyl, and the like; or aroyl having 7 to 11 carbon atoms mono or di-substituted with alkoxy as defined above, fluorine or chlorine carbalkoxy having 2 to 7 carbon atoms, e.g., carbomethoxy, carbethoxy carbisopropoxy and the like; carbalkenyloxy having 4 to 7 carbon atoms, e.g., carballyloxy, carbo-4-methyl-2-pentenyloxy and the like or carbaryloxy having 7 to 11 carbon atoms, e.g., carbobenzoxy, carbotolyloxy, carbonaphthoxy and the like and pharmaceutically acceptable acid addition salts thereof, provided that only one of $R_1$ and $R_2$ is tertiary alkyl having the tertiary carbon atoms bonded to the aromatic nucleus or tertiary alkoxy where the tertiary carbon atom is attached to the oxygen atom.

The compounds of formula (I) above are known and may be prepared according to methods disclosed in the literature from known materials, for example, as described in Examples LV and LVI of U.S. Pat. No. 3,594,480. The present invention contemplates only the novel use of such compounds in pharmaceutical applications, in particular, as positive inotropic agents on cardiac muscle in the treatment of myocardial shock.

As indicated above, the compounds of formula (I) are useful in animals as positive inotropic agents as indicated by increased cardiac contractability as measured in anesthetized dogs using a Walton Brodie strain gage. The dog is anesthetized with 30 milligrams per kilogram (30 mg/kg) i.v. of pentobarbital sodium, i.v. Blood pressure is recorded with a transducer via tubing inserted into a femoral artery. A cannula is placed in the contralateral femoral vein for drug administration. The trachea is isolated, divided and cannulated with tubing from a Harvard air pump in order to maintain respiration. A left thorocotomy is performed between the 4th and 5th intercostal spaces and the opening in the chest widened with retractors. The pericardium is opened and the edges sewn to the chest opening to form a cradle for the heart. Care must be taken not to cut the phrenic nerve which runs along the pericardium. A segment of the left anterior descending artery is isolated. The coronary artery is litigated and the distal portion of the artery cannulated with tubing which carries blood from the central stump of a previously cannulated carotid artery. Blood flow is measured electronically. The Walton Brodie strain gage arch is then sewn to the portion of the myocardium perfused by the cannulated coronary artery. The opening in the chest is then covered with gauze pads which have been saturated with saline.

Heart rate is measured with either a tachometer driven by the contractile force signal or by that of the electrocardiogram. Rectal temperature is monitored, and body temperature are maintained by an electric heating pad which has previously been placed under the animal.

Before administration of a test compound the hyperemia reflex is tested by occluding the coronary flow for 20 seconds. Twenty micrograms per kiologram of animal body weight nitroglycerine (20 mcg/kg) is administered i.v. as a reference agent. The compound to be tested is administered in doses of 0.1, 1.0, 5.0 and 10.0 mg/kg i.v. Suitable solvent controls are performed as necessary. The test compound, if active by the i.v. route, can also be tested by direct intra-arterial injection into the tubing leading to the coronoary artery. All parameters are recorded either with a Sanborn or a Grass polygraph.

For such usage, the compounds may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g., a sterile injectable aqueous solution. The compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintetration and absorption in the gastrointestinal tract and thereby provide a sustained action over a longer period. Similarly, oral liquids, e.g., suspensions may contain the active ingredient in admixture with any of the conventional excipients utilized for the preparation of such compositions, e.g., suspending agents (methylcellulose, tragacanth and sodium alginate) wetting agents (lecithin, polyoxyethylene stearate and polyoxyethylene sorbitan mono-oleate) and preservatives (ethyl-o-hydroxybenzoate). Capsules may contain the active ingredient alone or admixed with an inert solid diluent, e.g., calcium carbonate, calcium phosphate and kaolin. The injectable compositions are formulated as known in the art. These pharmaceutical preparations may contain up to about 90 percent of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid, and, accordingly, are included within the scope of the invention. Representative of such salts are the mineral acid salts, such as the hydrochloride, hydrobromide sulfate, phosphate and the like and the organic acid salts, such as the succinate, benzoate, acetate, p-toluenesulfonate, benzene-sulfonate, maleate, malate, tartrate, methanesulfonate, cyclohexylsulfamate and the like.

The positive inotropic effective dosage of the compound of formula (I) employed in the alleviation of myocardial shock in cardiac muscle may vary depending on the particular compound employed, the manner of administering and the severity of the condition being treated. However, in general, satisfactory results are obtained when the compounds of formula (I) are administered at a daily dosage of from about 0.0001 milligrams to about 10 milligrams per kilogram of animal body weight i.v. or, for prophylactic use, 0.1 milligrams to 200 milligrams per kilogram of animal body weight p.o. The compounds are given in a single dose i.v. as needed (p.r.n.); and orally, they are preferably given in divided doses two to four times a day, or in sustained release form. For most large mammals, the total daily dosage is from about 0.1 milligrams to about 10 milligrams p.r.n. i.v. or, prophylactically, 1 milligram to 500 milligrams p.o. Dosage forms suitable for prophylactic oral use comprise from about 0.25 to about 250 milligrams of the active compound in intimate admixture with a solid or liquid pharmaceutically acceptable carrier or diluent.

Compounds of formula (I) in addition to the previously mentioned preferred compound which can be used as the active ingredient include the following:
1. 1-(4-methyl-1-piperazinyl)-7-hydroxy-6-methoxy-3-methylisoquinoline, 2. 1-(4-[2-propyl]-1-piperazinyl)-6-hydroxy-7-methoxyisoquinoline; 3. 1-piperazinyl-6,7-dihydroxy-3-methylisoquinoline;
4. 1-(4-hexyl-1-piperazinyl)-7-methoxy-6-methylisoquinoline;
5. 1-(4-allyl-1-piperazinyl)-7-methoxyisoquinoline;
6. 1-(4-[4-hepten-2-yl]-1-piperazinyl)-6,7-dimethoxyisoquinoline;
7. 1-(4-phenyl-1-piperazinyl)-6,7-dimethylisoquinoline;
8. 1-(4[m-tolyl]-1-piperazinyl)-7-hydroxy-6-ethoxyisoquinoline;
9. 1-(4-[5-propyl-3-tolyl]-1-piperazinyl)-7-hydroxy-6-methoxy-3-methylisoquinoline;
10. 1-(4-[p-chlorophenyl]-1-piperazinyl)-6,7-dimethoxyisoquinoline;
11. 1-(4-[p-fluorophenyl]-1-piperazinyl)-6,7-dimethoxyisoquinoline;
12. 1-(4-[4-tertiarybutoxyphenyl]-1-piperazinyl)-6,7-dimethoxyisoquinoline;
13. 1-(4-naphthyl-1-piperazinyl)-7-hydroxy-6-methoxyisoquinoline;
14. 1-(4-carballyloxy-1-piperazinyl)-6-hydroxy-7-methoxyisoquinoline;
15. 1-(4-carbo-[2-methyl-penten-3-oxy]-1-piperazinyl)-benz[g]isoquinoline;
16. 1-(4-carbobenzoxy-1-piperazinyl)-6,7-dihydroxy-3-methylisoquinoline;
17. 1-(4-[carbo-2,5-dimethylbenzoxy]-1-piperazinyl)-7-hydroxy-6-methoxy-3-methylisoquinoline;
18. 1-(4-[carbo-3-methyl-5-propyl-benzoxy]-1-piperazinyl)-7-hydroxy-6-methoxy-3-methylisoquinoline;
19. 1-(4-carbo-$\beta$-naphthoxy-1-piperazinyl)-7-hydroxy-6-methoxy-3-methylisoquinoline;
20. 1-(4-acetyl-1-piperazinyl)-6,7-dimethoxyisoquinoline;
21. 1-(4-isobutyryl-1-piperazinyl)-6-methoxy-3,7-dimethylisoquinoline;
22. 1-(4-valeryl-1-piperazinyl)-7-hydroxy-6-ethoxyisoquinoline;
23. 1-(4-benzoyl-1-piperazinyl)-benz[g]isoquinoline;
24. 1-(4-[p-chlorobenzyl]-1-piperazinyl)-6,7-dimethoxyisoquinoline;
25. 1-(4-[p-fluorobenzoyl]-1-piperazinyl)-6,7-dimethoxyisoquinoline;
26. 1-(4-[p-methoxybenzoyl]-1-piperazinyl)-6,7-dimethoxyisoquinoline;
27. 1-(4-m-toloyl-1-piperazinyl)-6,7-propylenedioxyisoquinoline;
28. 1-(4-[2-methyl-5-propylbenzoyl]-1-piperazinyl)-7-hydroxy-6-methoxy-3-methylisoquinoline;
29. 1-(4-naphthoyl-1-piperazinyl)-7-methoxyisoquinoline;
30. 1-(4-carbomethoxy-1-piperazinyl)-6,7-dimethoxyisoquinoline;
31. 1-(4-carbisopropoxy-1-piperazinyl)-6,7-dimethoxyisoquinoline and
32. 1-(4-carbovaleryloxy-1-piperazinyl)-6,7-dimethoxyisoquinoline.

The preferred compositions for prophylactic use from the standpoint of preparation and ease of administration are solid compositions, particularly hard-filled capsules and tablets containing from about 5 to 50 milligrams of the active ingredient.

EXAMPLES 1 AND 2

Tablets and Capsules Suitable For Oral Administration

Tablets and capsules containing the ingredients indicated below may be prepared by conventional techniques and are useful positive inotropic agents at a dose of one tablet or capsule 2 to 4 times a day.

| Ingredient | Weight (mg) | |
|---|---|---|
| | tablet | capsule |
| 1-(4-methyl-1-piperazinyl)-6,7-dimethoxyisoquinoline | 10 | 10 |
| tragacanth | 10 | — |
| lactose | 237.5 | 290 |
| corn starch | 25 | |
| talcum | 15 | |
| magnesium stearate | 2.5 | |
| Total | 300 mg. | 300 mg. |

Tablets and capsules useful in the treatment of myocardial shock may be prepared in a similar manner using compounds 1 to 32 above as the active ingredient.

EXAMPLES 3 AND 4

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses which may be administered as positive inotropic agents. The injectable suspension is suitable for administration i.v. (p.r.n.) once a day whereas the oral liquid suspension is suitable administered 2 to 4 times per day for this purpose.

| Ingredients | Weight (mg) | |
|---|---|---|
| | injectable suspension | liquid suspension |
| 1-(4-methyl-1-piperazinyl)-6,7-dimethoxyisoquinoline | 5 | 10 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| mathyl paraben, U.S.P. | — | 4.5 |
| propyl paraben, U.S.P. | — | 1.0 |
| polysorbate 80 (e.g. Tween 80), USP | — | 5 |
| sorbitol solution, 70%, USP | — | 2,500 |
| buffer agent to adjust pH for desired stability | q.s. | q.s. |
| water | q.s. for injection, q.s. to 1 ml | q.s. to 5 ml |

Similarly, injectable suspensions and oral liquid suspension useful in the treatment of mycardial shock may be prepared in the same manner using compound 1 to 32 above as the active ingredient.

What is claimed is:

1. A method of treating myocardial shock which comprises administering to a mammal in need of said treatment an effective amount for the treatment of myocardial shock of a compound of the formula:

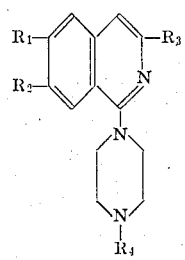

where
R$_1$ and R$_2$ each independently represent hydrogen, hydroxy, lower alkyl, or lower alkoxy or
R$_1$ and R$_2$ together represent alkylenedioxy having 1 to 4 carbon atoms or together with the carbon atoms to which they are attached they represent fused benzene;
R$_3$ is hydrogen or lower alkyl and
R$_4$ is hydrogen, lower alkyl, alkenyl having 3 to 6 carbon atoms, aryl having 6 to 10 carbon atoms, aryl having 6 to 10 carbon atoms mono or di-substituted with lower alkoxy, fluorine or chlorine, alkanoyl having 2 to 6 carbon atoms, aroyl having 7 to 11 carbon atoms or aroyl having 7 to 11 carbon atoms, mono or di-substituted with lower alkoxy, fluorine or chlorine, carbalkoxy having 2 to 7 carbon atoms, carbalkenyloxy having 4 to 7 carbon atoms or carbaryloxy having 7 to 11 carbon atoms
or a pharmaceutically acceptable acid addition salt thereof, provided that only one of R$_1$ and R$_2$ is tertiary alkyl having the tertiary carbon atom bonded to the aromatic nucleus or tertiary alkoxy having the tertiary carbon atom attached to the oxygen atom.

2. A method according to claim 1 in which R$_1$ and R$_2$ each independently represent hydrogen, hydroxy, methoxy or methyl, R$_3$ is hydrogen and R$_4$ is hydrogen or lower alkyl having 1 to 4 carbon atoms.

3. A method according to claim 1 in which R$_1$ and R$_2$ are methoxy, R$_3$ is hydrogen and R$_4$ is lower alkyl having 1 to 4 carbon atoms.

4. A method according to claim 1 wherein the compound is administered intravenously at a daily dosage of from about 0.01 milligrams to about 10 milligrams.

5. A method according to claim 1 wherein the compound is administered orally at a daily dosage of from about 1 milligram to about 500 milligrams.

6. A method according to claim 1 wherein the compound is orally administered in a unit dosage form comprising said compound to the extent of from about 0.25 milligrams to about 250 milligrams per unit dosage.

7. A method according to claim 1 in which the compound is 1-(4-methyl-1-piperazinyl)-6,7-dimethoxyisoquinoline.

* * * * *